Figure 1:
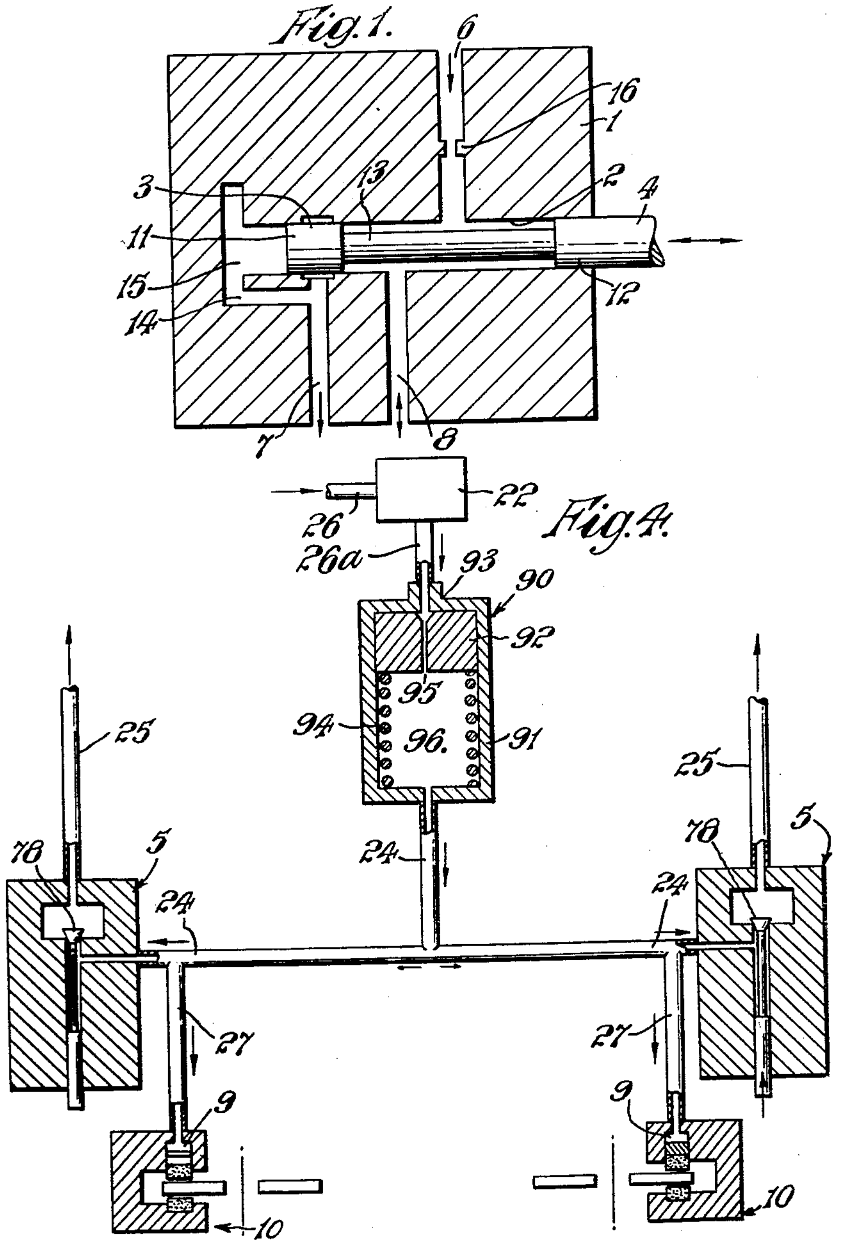

Dec. 5, 1961 H. W. TREVASKIS 3,011,831

PRESSURE-FLUID VALVE MECHANISM AND BRAKING SYSTEMS INCORPORATING SAME

Filed Aug. 6, 1957 4 Sheets-Sheet 1

INVENTOR

Henry William Trevaskis by Benj. T. Rauber his attorney

Dec. 5, 1961 H. W. TREVASKIS 3,011,831

PRESSURE-FLUID VALVE MECHANISM AND BRAKING SYSTEMS INCORPORATING SAME

Filed Aug. 6, 1957 4 Sheets-Sheet 2

INVENTOR
Henry William Trevaskis
by Benj. T. Rauber
his attorney

Dec. 5, 1961 H. W. TREVASKIS 3,011,831
PRESSURE-FLUID VALVE MECHANISM AND BRAKING SYSTEMS INCORPORATING SAME
Filed Aug. 6, 1957 4 Sheets-Sheet 3
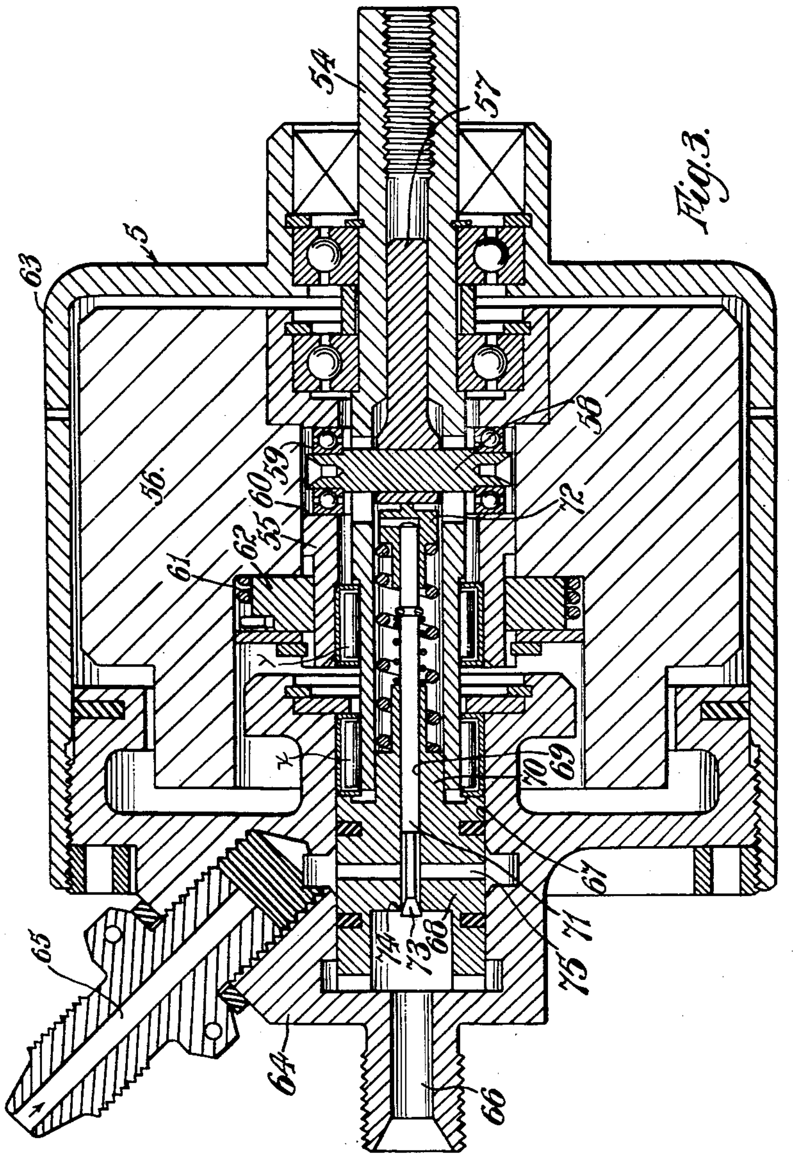
INVENTOR
Henry William Trevaskis
by Benj: T. Rauber
his attorney INVENTOR
Henry William Trevaskis
by Benj. T. Rauber
his attorney

United States Patent Office 3,011,831

Patented Dec. 5, 1961

1

3,011,831

PRESSURE-FLUID VALVE MECHANISM AND BRAKING SYSTEMS INCORPORATING SAME

Henry William Trevaskis, Blackdown, near Leamington Spa, England, assignor to Dunlop Rubber Company Limited, London County, England, a British company Filed Aug. 6, 1957, Ser. No. 676,518
Claims priority, application Great Britain Aug. 11, 1956
7 Claims. (Cl. 303—24)

This invention relates to a valve mechanism to control a supply of fluid, particularly to and from a brake-operating mechanism or the like, and to a braking system in which such a valve mechanism is incorporated.

Anti-skid devices for aircraft and vehicle wheels are known which detect an incipient wheel skid or slide and which control the operation of a valve mechanism interposed in the pressure line between the wheel brake and the source of pressure and thereby prevent the wheel skid or slide from actually taking place.

One object of the present invention is to provide an improved valve mechanism which is particularly suitable for installation in a fluid-pressure operated vehicle braking system comprising such a device. A further object of the invention is to provide a fluid-pressure operated vehicle braking system in which such a valve mechanism is incorporated.

According to the present invention a fluid pressure valve mechanism comprises a constantly-open inlet conduit, means to restrict the flow of pressure-fluid therethrough, a constantly-open supply conduit from said inlet conduit to a fluid-pressure operated device, an exhaust conduit and a valve normally closing said exhaust conduit and operable to open same to divert the pressure-fluid in said inlet and supply conduits to exhaust.

Also according to the present invention a fluid-pressure operated braking system for vehicles comprises a braking mechanism, a constantly-open inlet conduit connecting the braking mechanism with a source of fluid-pressure, an exhaust conduit connecting said inlet conduit with exhaust, a valve mechanism interposed between said conduits, flow-restricting means in said inlet conduit and means associated with a wheel of said vehicle and operable upon deceleration thereof in excess of a predetermined value to open a valve in said mechanism and allow the pressure in said inlet conduit to flow to exhaust thus rendering said mechanism inoperative.

Preferably the valve is a slidable valve and the valve mechanism is for the control of hydraulic brakes. The valve mechanism is particularly useful in association with a rotary-inertia device for automatically preventing the skidding of vehicle wheels due to road conditions and/or over-application of the brakes.

Figure 2:
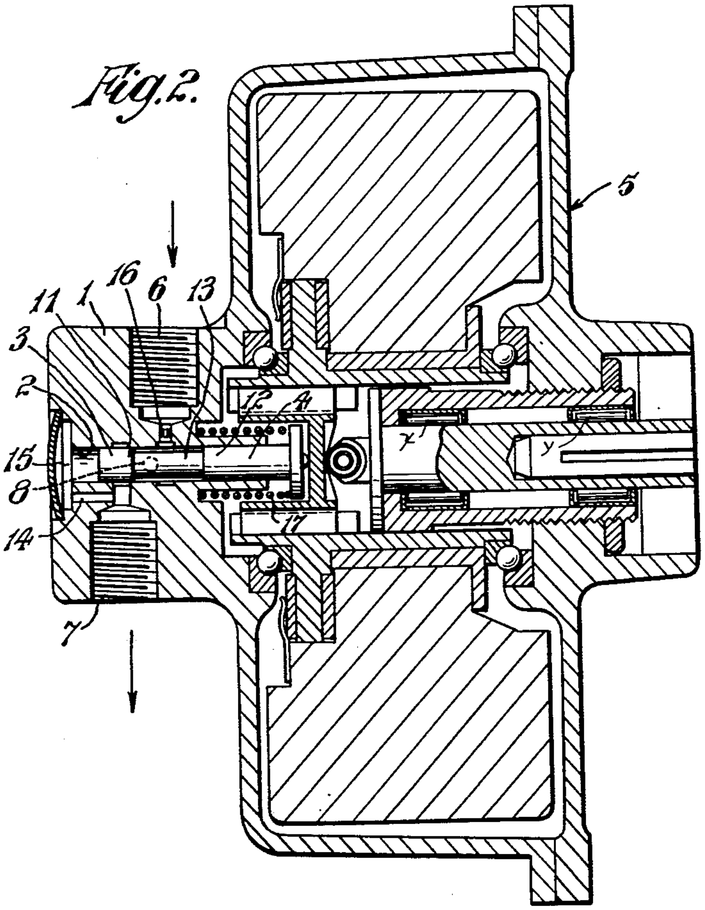
Figure 5:
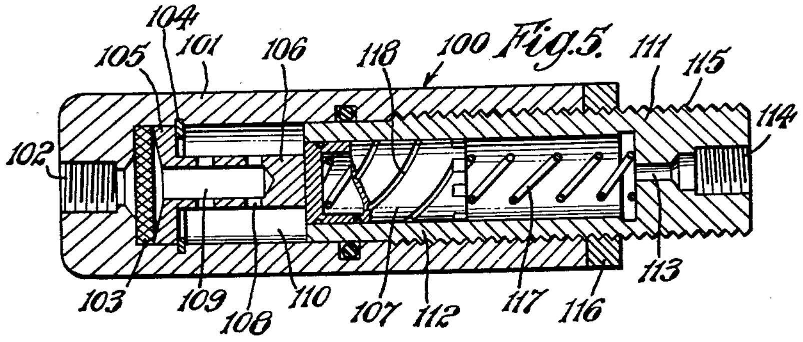
Figure 6:
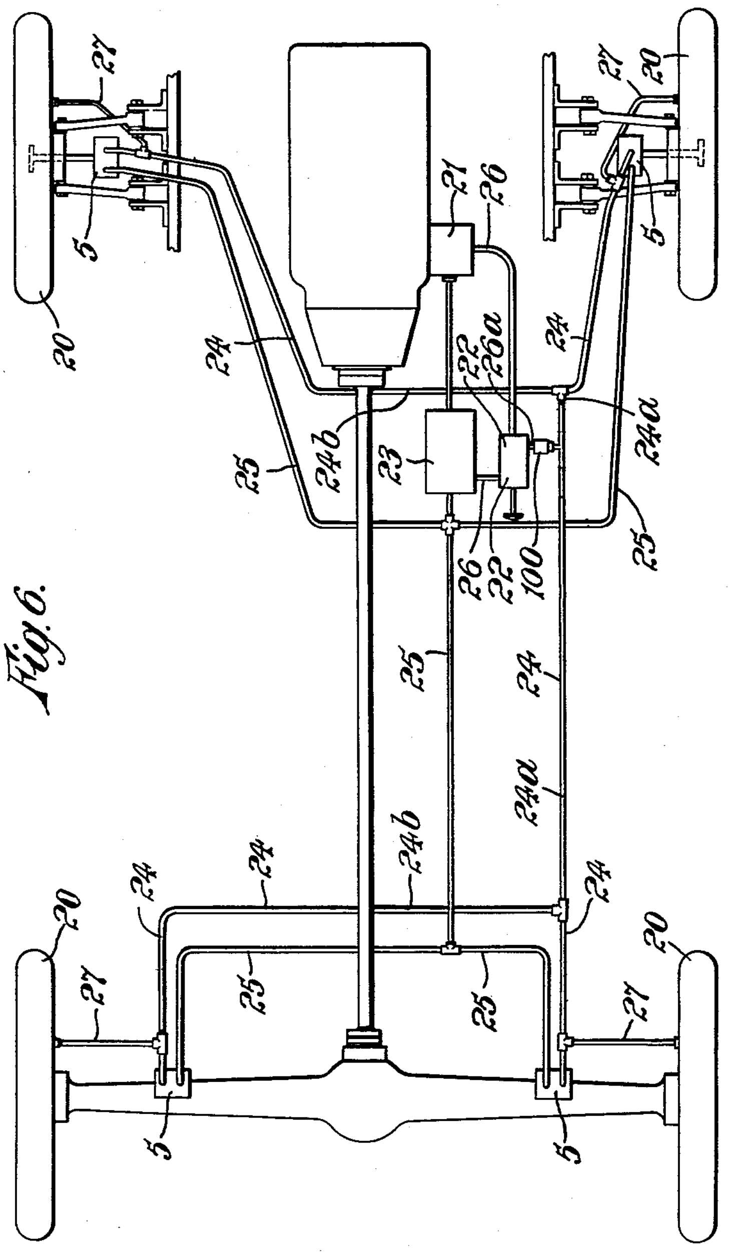

But a better understanding of the invention may be obtained from the following description when this is read with reference to the accompanying drawings, of which:

FIGURE 1 is a sectional diagrammatic view of one form of valve mechanism according to the invention, FIGURE 2 is a sectional view of one form of rotary inertia skid-sensing mechanism incorporating the valve mechanism of FIGURE 1, FIGURE 3 is a similar view of a further form of rotary inertia mechanism incorporating a modified valve assembly, FIGURE 4 is a diagrammatic view of portion of a brake system incorporating the valve mechanism of FIGURE 3, FIGURE 5 is a section of a modified restrictor valve, and FIGURE 6 shows a complete braking system incorporating either form of the invention.

In one embodiment of a valve mechanism according to the present invention (FIGURES 1 and 2) a slide valve mechanism for a rotary-inertia mechanism for vehicle wheel brakes comprises a valve block 1 having a bore 2 extending thereinto from one end to receive a slide valve member 3. Said member 3 is connected with the operating rod 4 of said rotary inertia mechanism 5 (FIGURE 2).

2

A conduit 6, extending through the block 1, connects the bore 2 adjacent the end associated with the rotary-inertia mechanism 5 with a source of pressure-fluid under the control of the driver of the vehicle. Another conduit 7 adjacent the other end of the bore 2 connects said bore with a liquid reservoir or with atmosphere whilst an intermediate conduit 8 connects the bore 2 at an intermediate location with the brake operating mechanism 9 of a wheel brake 10 (FIGURE 4).

The slide valve member 3 comprises two lapped plunger portions 11, 12 each fluid-tightly slidable in a lapped portion of the bore 2 and connected by a neck 13 of smaller diameter. The plunger portion 12 is located within the open end of the bore, i.e. the end adjacent the rotary-inertia mechanism 5, to prevent leakage of pressure fluid from the valve block 1, whilst the plunger portion 11 is situated in the closed end of the bore 2, and is arranged normally to cover and close the exhaust conduit 7. A passage 14 connects the exhaust conduit 7 with the closed end 15 of the bore to prevent the entrapment of fluid in that end of the bore and the consequential resistance to free movement of the operating rod 4.

The inlet conduit 6 is at all times in fluid communication, through the bore 2 of the valve block 1, with the pressure conduit 8. Movement of the operating rod 4 of the rotary-inertia device 1 in an operative direction opens or uncovers the exhaust conduit 7 but it does not close or cover either the inlet conduit 6 or the pressure conduit 8.

A restrictor 16 introduced into the inlet conduit 6, is adapted to allow a predetermined rate of flow through the conduit 6, through the pressure conduit 8 and thus to the brake 10. The calibration of this restrictor 16 is such that it permits normal operation of the brake 10 without abnormal delay. For example, the restrictor orifice may have a diameter of 0.018 inch. The exhaust conduit 7 is considerably larger than the restricted inlet conduit 6 so that, on opening the exhaust conduit 7, fluid pressure in the brake 10 rapidly flows therethrough.

In use the inlet conduit 6 is in constant communication with the pressure conduit 8, and thus with the brakes 10. The inlet conduit 6, though restricted, permits adequate flow of pressure-fluid to permit normal application of the brakes 10. If, when the brake 10 is applied, the rotary-inertia mechanism 5 detects an incipient wheel slip or skid it causes the operating rod 4 to move the valve member 3 to open the exhaust conduit 7, the inlet conduit 6 remaining open. The exhaust conduit 7 is unrestricted, with the result that the pressure in the brake 10 together with the pressure flowing from the source through the restricted inlet orifice 16, both flow rapidly through the exhaust orifice 7, and back to the reservoir or to atmosphere. The pressure in the brake 10 thus rapidly drops and the skidding condition of the wheel is averted.

With the wheel rotating normally once more spring means 17 associated with the rotary-inertia mechanism 5 actuates the operating rod 4 in the opposite direction to move the valve member 3 and once more close the exhaust conduit 7. Fluid-pressure from the source, flowing continuously through the restricted inlet orifice 16, then builds up the braking pressure once more to apply the brake 10. The operation of a rotary-inertia mechanism is more fully described hereunder.

In another embodiment of the invention (FIGURES 3 to 6) the number of pressure-fluid connections to the rotary-inertia skid-sensing mechanism is reduced to two and the valve mechanism is simplified accordingly.

As shown diagrammatically in FIGURE 6, a rotary-inertia skid-sensing mechanism 5 of a modified type shown in FIGURE 3, and later to be described is associated with each wheel 20 of a vehicle and is driven from the associated wheel or, in the case of the rear axle, by the associated half shaft. The pressure-fluid supply system comprises a pump or compressor 21 driven by the engine of the vehicle and normally, in the case of a liquid braking system, circulating pressurised liquid from the pump 21 through a by-pass valve in the brake control valve or "master cylinder" 22 to a tank or reservoir 23, which is open to atmosphere. The pump 21 draws its supply from the tank or reservoir 23. Where the pressure-fluid used is compressed air the pump 21 is in the form of a compressor fitted with an unloading valve and the tank or reservoir 23 is replaced by an air receiver, all in the known manner. The master cylinder 22 then comprises an air valve operable to pass air from the receiver into the inlet conduit 24. In this case the exhaust lines 25 back to the receiver 23 would be dispensed with and the brakes be exhausted to atmosphere. Other than this a hydraulic and a pneumatic system according to the invention will be substantially the same, the essential feature of the pressure-fluid supply being that upon operation of the brake control valve 22 the whole braking system is instantly supplied with a constant flow of pressure-fluid.

From the pump or compressor 21 the pressure-fluid is passed through a supply conduit 26 to the brake control valve 22 and thence through the inlet conduits 24 to the respective rotary-inertia skid-sensing mechanisms 5, where they are connected to an inlet passage 65 (FIGURE 3) in the valve block 64 of the mechanism. Branching off from the inlet conduits 24 adjacent each mechanism 5 is a pressure conduit 27 which is adapted to convey pressure-fluid from the inlet conduits 24 to the respective brake-operating mechanism 9. Thus, instead of being branched-off from the conduit from the inlet 6 to the exhaust 7 of the valve mechanism inside the rotary-inertia mechanism 5, as at 8 in FIGURES 1 and 2, the pressure line 27 is taken off from the inlet line 24 outside the rotary-inertia mechanism and the valve mechanism is simplified by the omission of a pressure-fluid connection thereto.

The rotary-inertia mechanism 5 is fundamentally of the kind disclosed in my Patent 2,656,017, October 20, 1953, but is especially adapted to be used in a road vehicle.

Briefly, as shown in FIGURE 3, this device comprises a spindle 54 adapted to be driven by the front or rear wheel of a vehicle, or by some other rotatable member associated therewith. The spindle 54 is drivingly associated with a surrounding sleeve 55 which in turn, frictionally engages a rotatable fly-wheel 56 of substantial mass. The spindle 54, whilst adapted to drive the sleeve 55, has a circumferential lost-motion connection therewith of the order of some 40°. A plunger 57 is slidable within the spindle 54 and has a cross arm 58, at each end of which is a ball race 59 slidably received in V-shaped slots 60 in the sleeve 55, the apices of the V-shaped slots 60 being directed towards the free end of the spindle 54. Frictional engagement between the sleeve 55 and the fly-wheel 56 is by a helical friction member 61 having one end secured to a ring 62 secured to the sleeve 55. The outer periphery of the member 61 is in frictional engagement with the fly-wheel 56 so that relative rotation between the sleeve 55 and fly-wheel 56 in one direction tends to unwind the helix 61 to provide a heavy driving torque and relative movement in the opposite direction tends to wind-up the helix and provide a light torque.

The mechanism is enclosed in a cup-like housing 63 from the closed end of which the spindle 54 protrudes. The open end of the housing is closed by a closure member or valve block 64 having a pressure-fluid inlet 65 and a pressure-fluid exhaust 66 therein, and a passage 67 co-axial with the sleeve 55.

Within the passage 67 is located a cylindrical member 68 having a central passage 69 co-axial therein, and a spigot 70 extends axially therefrom into the adjacent tubular end of the spindle 54. An operating rod 71 extends through the passage 69 into the spindle 54 and has a spring retainer 72 on its inner end, the spring retainer 72 being spring-urged into engagement with the adjacent end of the plunger 57.

The other end of the rod 71 is in the form of a valve 73 which is normally spring-urged against a valve seat 74 formed at the adjacent end of the passage 69. A fluid passage 75 extends across the passage 69 from the inlet passage 65, and the rod 71 is reduced in diameter at this point to provide a passage for fluid through the end of the passage 69 to exhaust 66 when the valve 73 is opened.

The operation of this device is that when the vehicle first moves, the spindle 54 is rotated by the appropriate wheel or axle, the lost-motion between the spindle 54 and sleeve 55 is taken up, and the rotating sleeve 55 begins to rotate the fly-wheel 56 through the friction member 61, which is arranged to give its maximum torque in this condition. As the lost-motion is taken up, the ball races 59 move into the arms of the V-slots 60, moving the plunger 57 towards the closure 64 and opening the valve 73. This is of no significance at this stage as the brakes are not required during acceleration and even a slight check in acceleration will automatically close the valve, as will be evident hereunder.

As soon as the fly-wheel 56, sleeve 55 and spindle 54 are rotating at the same speed the driving torque of the spindle 54 which forced the ball races 72 into the arms of the slots 60 is relieved, and they are returned to the apices of the V's by the spring pressure upon the retainer 72 and plunger 57, and the valve 73 is closed.

The frictional engagement between the fly-wheel 56 and sleeve 55, and the spring-urged pressure of the retainer 72 upon the plunger 57 is such that in normal braking, i.e., slow deceleration of the spindle 54, the fly-wheel, sleeve and spindle decelerate simultaneously and the ball races 59 are retained in the apices of V-slots 60. If, however, due to excess braking, greasy roads or other conditions an undue deceleration of the wheel is caused which may lead to skidding or locking of the wheels, this deceleration also decelerates the spindle 54. The mass of the fly wheel 56 causes it to continue to rotate, and its frictional engagement with the sleeve 55 rotates the sleeve through the lost-motion angle and moves the ball races 59 into the arms of the V-slots 60, moves the plunger 57 axially towards the closure 64 and opens the valve 73, permitting the pressure fluid in the inlet line 24 and passage 65 to flow through the exhaust 66 and also relieving the pressure in the supply conduit 27 and brake-operating mechanism 9.

This allows the affected wheel to rotate freely once more, and as soon as the spindle, sleeve and fly-wheel are again rotating in unison the ball races 59 are forced back into the apices of the V-slots 60 and the valve 73 closes to permit the brakes to re-engage.

This operation of release and re-engagement is very rapid and is in the form of a "hunting" action which results in the maximum braking effect being obtained without locking or skidding of the wheels, no matter how fiercely the brakes may be applied.

The restrictor 16 of the previous embodiment was described as an orifice in the inlet conduit or passage. Such a restriction is an effective arrangement and may be quite satisfactory in some applications of the valve mechanism. Where it is applied to vehicle brakes, however, a more rapid operation is required to obtain the initial application of the brake than can be obtained by forcing the whole of the required pressure-fluid through the restrictor, although the restrictor is still necessary to prevent the subsequent application of pressure greatly in excess of that required for normal braking.

Accordingly, as shown in FIGURES 4 and 5, a restrictor valve 90 or 100, which may be adjustable or otherwise, and is pre-calibrated to the appropriate volumetric capacity of the brake, is provided so that upon initial operation of the brake control valve 22 to apply the brakes an immediate unrestricted flow of pressure-fluid, of the volume necessary to fill the brake-actuating mechanism 9 to take up clearances between the friction means and the rotating brake disc or drum, is available and the fluid-pressure necessary to cause the actual frictional engagement is then forced through the restricted passage or orifice.

As shown in FIGURE 4 one form 90 of a restrictor valve comprises a housing 91 having a pressure-fluid inlet at each end and which is adapted to be interposed in the pressure-fluid inlet conduit 24, or between a supply conduit 26*a* and the inlet conduit 24. A piston 92 is slidable within the housing 91 and is normally urged towards the supply end 93 thereof by a helical compression spring 94. A passage 95, of restricted diameter, is formed co-axially through the piston 92. The respective sizes of the housing 91, piston 92 and spring 94 are so coordinated that upon the operation of the control valve 22 pressure-fluid admitted into the supply end 93 of the housing 91 moves the piston 92 against the spring 94 for such a distance that the fluid displaced from the space 96 below the piston is just sufficient to fill the spaces in the brake-operating mechanism 9 and bring the friction means into light rubbing engagement with the brake disc or drum. The piston 92 is then at its limit of movement and continued operation of the valve 22 will force pressure-fluid for the actual engagement of the brake through the passage 95.

It should be appreciated that operation of the rotary-inertia mechanism is so rapid that although it relieves the braking pressure this pressure does not fall so low as to permit the brake-actuating mechanism to retract to its normal inoperative clearance. The piston 92 is operative, therefore, only on the initial application of the brake on each occasion. This embodiment of the restrictor is applicable only to braking systems incorporating means to maintain the brake clearances constant regardless of wear in the friction material.

A modified form of restrictor 100 is shown in FIGURE 5, and incorporates means whereby the volume of unrestricted fluid injected into the brake-operating mechanism may be adjusted to allow for wear of the friction material or to make the device interchangeable between brakes of different types and fluid capacities.

This restrictor 100 comprises a cylindrical housing 101 open at one end and having a connection 102 at the other end for attachment to a pressure fluid supply conduit 26*a* or inlet conduit 24, as will later be described. The inner opening of the connection 102 is covered by a filter 103 and secured in abutment wtih the filter 103 by a circular spring clip 104 is an annular disc 105 having a spigot 106 projecting co-axially into the housing 101. The end of this spigot is blank and forms a stop member to restrict retraction of the piston 107 towards the end of the housing. The spigot 106 is centrally bored throughout most of its length and radial apertures 108 in its wall provide passages for pressure-fluid from the bore 109 into the pressure chamber 110 of the housing.

Adjustably located in the open end of the housing 101 is a cylinder 111 having an anular skirt 112 extending deeply within the housing. The outer end of the cylinder 111 is closed and co-axially thereof a fluid passage 113 extends axially-outwardly into a connection 114 adapted to be connected to a valve 5. A screw thread 115 on the periphery of the cylinder adjacent its blanked end is adapted to engage with a mating thread on the inner periphery of the housing 101, and the depth of penetration of the skirt 112 into the housing is adjustable thereby. A locking ring 116 is provided to lock the cylinder 111 in any predetermined position.

A cylindrical skirted piston 107, is inserted in the cylinder 111 so that its skirt is directed towards the passage 113, and it is held with its head in abutment with the stop spigot 106 by a helical compression spring 117 held in compression between the head of the piston and the closed end of the cylinder. The piston 107 has formed in its outer periphery a number of spiral grooves 118 of small width and depth. Each groove 118 extends from one end of the piston to the other end, and in association with the adjacent wall of the cylinder 111, defines a restricted passage for pressure-fluid.

Upon actuation of the brake control valve 22 pressure-fluid enters the chamber 110 and forces the piston 107 to the end of the cylinder 111, thus expelling the fluid within the space defined by the cylinder and interior of the piston to take up the brake clearances. Brake-operating pressure-fluid then passes through the restrictor grooves 118 to apply the brakes.

The volume of fluid so expelled may be varied by adjusting the penetration of the skirt 112 into the housing and thus increasing or decreasing the permitted travel of the piston 107.

The general arrangement of a braking system incorporating the present invention is shown in FIGURE 6. Although this drawing shows a hydraulic, or liquid-pressure, operated system a pneumatic system is substantially similar except for the substitution of an unloader-equipped air compressor for the pump 21, an air bottle, or receiver, for the reservoir 23, and the optional elimination of the exhaust conduits 25. As will be observed in FIGURE 6, the pressure conduits 27 are taken off from the inlet conduits 24 before they connect wtih the rotary-inertia devices 5.

FIGURE 6 shows restrictor devices 100, of the type described in relation to FIGURE 5, inserted in the inlet lines 24. It will be clear, however, that the restrictor 90 of FIGURE 4 can be substituted for the device 100 if so desired.

The location of the restrictor device 100 (or 90) in the inlet conduit 24 may be varied to produce different responses in the braking system to the opening of the valve 3 or 73 (FIGURE 2 or 3) to direct the pressure-fluid to exhaust. As the flow of presure-fluid through the restrictor devices is restricted and the flow of pressure-fluid through the exhaust conduit 25, when the valve is open, is substantially unrestricted, it follows that opening of the valve will cause an immediate substantial drop in pressure in the whole of the fluid system between the restrictor and exhaust. Thus, different responses to this drop in pressure may be obtained by placing the restrictor or restrictors in alternative positions in the inlet conduit 24.

Ignoring, for the moment, the restrictors 100, FIGURE 6 shows that the supply conduit 26 from the reservoir 23 (or receiver) is connected to the brake control valve 22, and a further supply conduit 26*a* then connects the valve 22 with a header 24*a* of the inlet conduit 24, the header 24*a* being extended forwardly and rearwardly of the valve 22 towards the front and rear axles. At each end of the header 24*a*, cross headers 24*b* are taken across the front and rear of the vehicle, and their opposite ends are connected with the rotary inertia devices 5 and pressure conduits 27.

If, therefore, the restrictor 100 is connected into the supply conduit 26*a* between the valve 22 and the header 24*a*, as shown in FIGURE 6, the operation of the rotary-inertia device 5 to open the valve 3 or 73 in any one of the devices will exhaust the whole of the inlet conduits 24. Thus, should a locking or skidding tendency develop in any one wheel of the vehicle this will relieve the whole of the brakes momentarily until the locking or skidding tendency is avoided, and any yawing or swerving due to uneven application of the brakes will be avoided.

If the restrictors are inserted in the header 24*a*, on each side of the supply conduit 26*a* and between conduit 26*a* and the cross headers 24*b*, opening of the exhaust valve in either rear wheel or in either front wheel will relieve the pressure in both the rear or front wheels, respectively. Thus, if for example, an incipient skid or locking tendency develops in, say, the near side front wheel, both front wheel brakes will momentarily be released whilst the rear wheel brakes will be unaffected unless one of those should, at the same time, develop an incipient skid or locking tendency.

An advantage of this arrangement over the single control of all the brakes is that as the separate control of the front and rear brakes reduces the volume of fluid exhaust where only one opposite pair of wheels is involved, the re-pressurising of the released brakes is more rapidly effected by the restricted fluid flow, and any time lag in re-applying the brakes is eliminated.

Where desired, the restrictors may be inserted in the line 24 between the cross header 24*b* and the rotary-inertia devices 5. In this arrangement individual control of one wheel brake is obtainable independently of the other brakes. This arrangement is not normally preferred as it may result in uneven braking and a consequential swerving or yawing of the vehicle, particularly on wet or icy roads. In some circumstances, as, for instance, in heavy, slow-moving vehicles where swerving would not be of any great significance, this arrangement may be preferred as, due to the small volume of fluid exhausted, the response of the brake on closing of the exhaust valve would be still more rapid than in the other arrangements described hereabove.

The effect of this valve mechanism is that the brakes 10 are applied far more smoothly than hitherto. Large pressure variations at the brake are substantially damped-out and brake judder is largely eliminated. A further advantage of the valve mechanism lies in its simplicity and economy of manufacture.

The valve member need not necessarily be actuated mechanically, as by an operating rod 4. It may be actuated through a solenoid, by an electrical signal relayed by a wheel-skid detector. The invention, however, need not be restricted to use with a wheel-skid detector. It may be used to replace any valve mechanism which controls the supply of pressure-fluid from a source to a mechanism to be operated, and from the mechanism to exhaust or to a reservoir.

Having now described my invention, what I claim is:

1. A braking system for road vehicles which comprises a fluid operated brake, a pump for supplying pressure fluid, a conduit for conducting said pressure fluid from said pump to said brake, said conduit comprising a cylindrical chamber having an inlet to receive fluid from said pump and an outlet delivering fluid to said brake, control means for controlling the supply of fluid from said pump to said brake, an exhaust valve from said conduit between said cylindrical chamber and said brake, a rotary inertia skid-sensing mechanism to open said exhaust valve upon deceleration of said vehicle in excess of a rate determined by said rotary inertia skid-sensing mechanism wherein said control means comprises a piston slidable in said cylindrical chamber between said inlet and said outlet, said piston having a restricted passage for pressure fluid from said inlet to said outlet and a spring biasing said piston toward said inlet when the supply of fluid is interrupted by said fluid control means and movable toward the outlet end of said cylindrical chamber upon the supply of fluid from said pump.

2. A system according to claim 1 wherein said control means is calibrated to provide upon initial operation of the brakes an immediate and unrestricted flow of pressure fluid of predetermined volume thereto, said predetermined volume being such as to take up brake clearances preparatory to applying braking pressure.

3. A system according to claim 2 comprising two brakes one for each side of the vehicle and a skid sensing mechanism for each brake and wherein said conduit comprises a junction between said pump and said sensing mechanisms and brakes and wherein said control means is interposed in the conduit between said junction and said pump.

4. The fluid pressure valve system of claim 1 in which the interior of said chamber is threaded inwardly from the outlet end and in which said system comprises an exteriorly threaded sleeve closed at its outlet end and provided at said outlet end with an outlet opening and threaded into the threaded portion of said chamber to adjust the extent of movement of said piston.

5. A fluid pressure operated braking system for vehicles comprising a braking mechanism, a constantly open conduit connecting the braking mechanism with a source of pressure fluid, an exhaust valve in said conduit, a fluid restricting means in said conduit between said valve and said source of pressure fluid and means associated with a wheel of a vehicle and operable upon deceleration thereof in excess of a predetermined value to open said exhaust valve and allow the pressure fluid in said conduit to flow to exhaust thus rendering said mechanism inoperative, said fluid restricting means comprising a housing having an inlet end connected, through a brake control valve, with said source of pressure fluid and an outlet end connected to the exhaust valve, a piston slidable within said housing and normally spring-urged towards said inlet end, means to permit a restricted flow of pressure fluid from said inlet end to said outlet end past said piston and means adapted upon initial admission of pressure fluid into said housing from said inlet end upon operation of said brake control valve to provide an unrestricted flow of pressure fluid of predetermined volume from said housing to said valve mechanism and having a fixed abutment for said piston extending axially inwardly of said housing from said inlet end, said outlet end of said housing comprising an annular skirted member having a fluid passage formed in the axially-outer end thereof and the skirted portion thereof being adjustably received in the adjacent end of said housing, said piston being slidably received within said skirted portion and having said means to provide a restricted flow of pressure fluid formed on its outer periphery, adjustment of said skirted member being adapted to vary between predetermined limits the volume of the unrestricted fluid flow from said housing to said valve mechanism upon the initial admission of pressure fluid into said housing by operation of said brake control valve.

6. A braking system for vehicles which comprises a fluid operated brake, a pump for supplying pressure fluid, a conduit for conducting said pressure fluid from said pump to said brake, means for controlling the supply of fluid from said pump to said brake, a pressure control mechanism connected in said conduit between said supply control means and said brake, said pressure control means comprising a flow restricting means in said conduit between said supply control means and said brake, an exhaust valve from said conduit between said flow restricting means and said brake, a rotary inertia, skid-sensing mechanism connected to said exhaust valve to open said valve upon deceleration of said vehicle in excess of a rate determined by said rotary inertia, skid-sensing mechanism, said rotary inertia skid-sensing mechanism comprising a flywheel, a driving mechanism driven by a wheel to be braked to drive said flywheel in a forward direction and having a light frictional engagement with said flywheel in reverse direction to permit said flywheel to override said driving mechanism, a valve actuating plunger to move said exhaust valve to open position and a cam means actuated by relative movement between said driving means and said flywheel to move said valve actuating plunger to open position upon relative movement of said driving means and said flywheel, said flow restricting means comprising a housing inserted in said conduit between said fluid supply control and said exhaust valve and providing a flow of fluid from an inlet end of said housing to an outlet end of said housing, a piston in said housing having a restricted passage therethrough, a spring in said housing biasing said piston toward the inlet end of said housing and means to adjust the range of movement of said piston in said housing.

7. The braking system of claim 6 in which said housing has a stop member projecting from the inlet end of said housing toward but short of the outlet end and in which said means to adjust the range of movement of said piston comprises an enclosure for said housing having a sleeve threaded into said housing and in which said piston and said spring are mounted in said sleeve.

References Cited in the file of this patent

UNITED STATES PATENTS

| | | |
|---|---|---|
| 2,038,145 | Cook et al. | Apr. 21, 1936 |
| 2,225,978 | Carmichael | Dec. 24, 1940 |
| 2,753,017 | Curl et al. | July 3, 1956 |
| 2,776,027 | Pendlebury | Jan. 1, 1957 |

FOREIGN PATENTS

| | | |
|---|---|---|
| 780,025 | Great Britain | July 31, 1957 |